United States Patent
Pitzer et al.

[15] 3,642,188
[45] Feb. 15, 1972

[54] WORKPIECE HANDLING AND CONVEYOR APPARATUS

[72] Inventors: Thomas D. Pitzer, Birmingham, Mich.; John A. Metzger, Glenview; John M. Lamberty, Des Plaines, both of Ill.

[73] Assignee: Kaiser Aluminum & Chemical Corporation by said Pitzer and said Metzger, Oakland, Calif.

[22] Filed: May 20, 1970

[21] Appl. No.: 39,070

[52] U.S. Cl. ..................................228/36, 29/564, 228/40
[51] Int. Cl. .........................................................B23k 1/08
[58] Field of Search ..................29/564; 228/36, 40, 37, 39; 198/198, 189, 162, 137

[56] References Cited

UNITED STATES PATENTS

| | | | |
|---|---|---|---|
| 492,986 | 3/1893 | Miller | 228/40 X |
| 1,318,871 | 10/1919 | Heine, Jr. | 228/36 |
| 2,770,875 | 10/1956 | Zimmerman | 228/36 X |
| 3,092,059 | 6/1963 | Tesch, Jr. | 228/40 X |
| 3,386,166 | 6/1968 | Tardoskeggi | 228/36 X |

Primary Examiner—John F. Campbell
Assistant Examiner—Robert J. Craig
Attorney—James E. Toomey, Paul E. Calrow, Harold L. Jenkins and John S. Rhoades

[57] ABSTRACT

Improved workpiece handling and conveyor apparatus for transferring workpieces past a plurality of workpiece treating stations, e.g., a flux station, a preheat station and a dip-soldering station and wherein the apparatus is provided with improved workpiece gripping and handling elements for effecting selective compound movements of a workpiece as the workpiece moves progressively through the various stations and from station to station.

17 Claims, 11 Drawing Figures

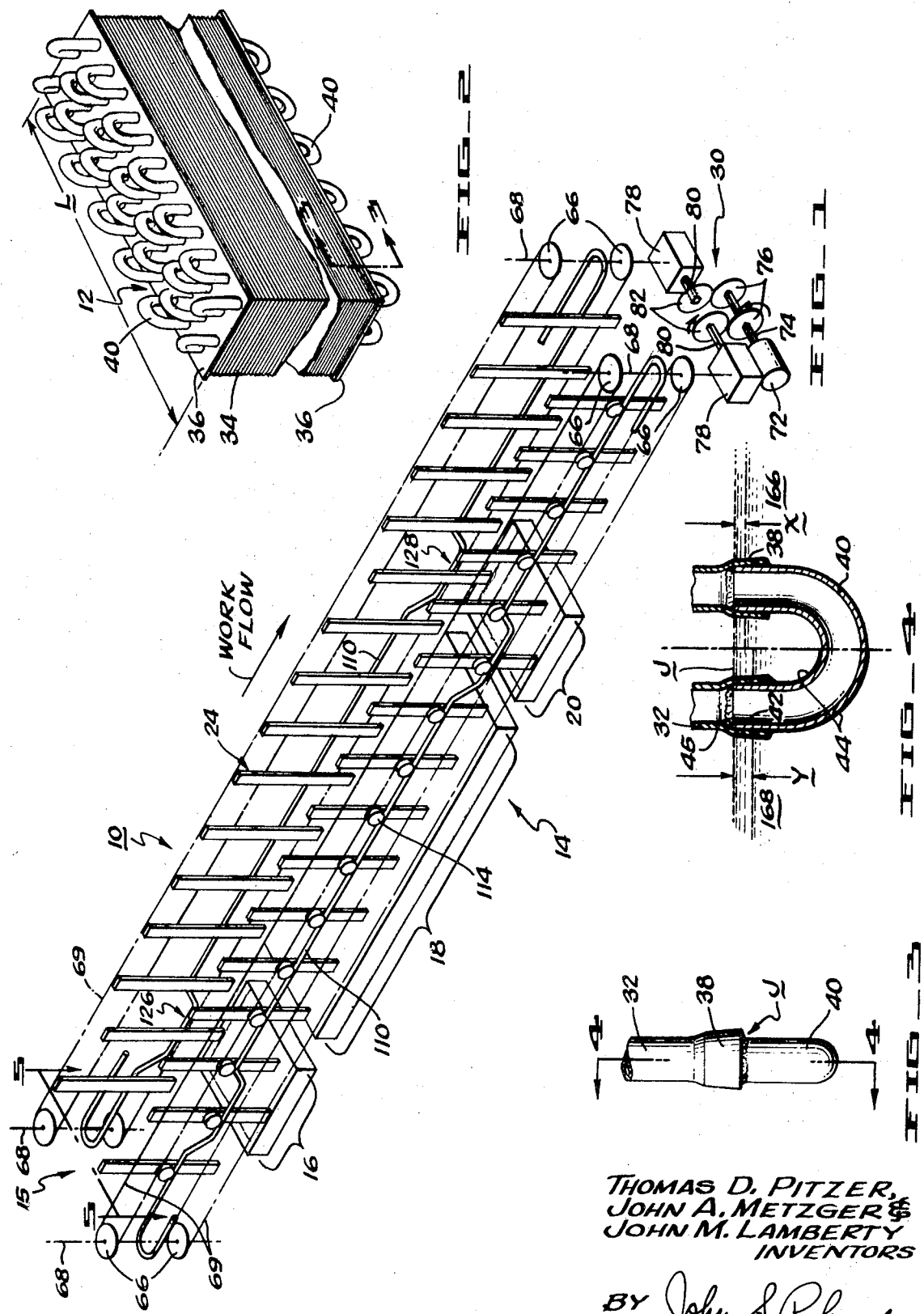

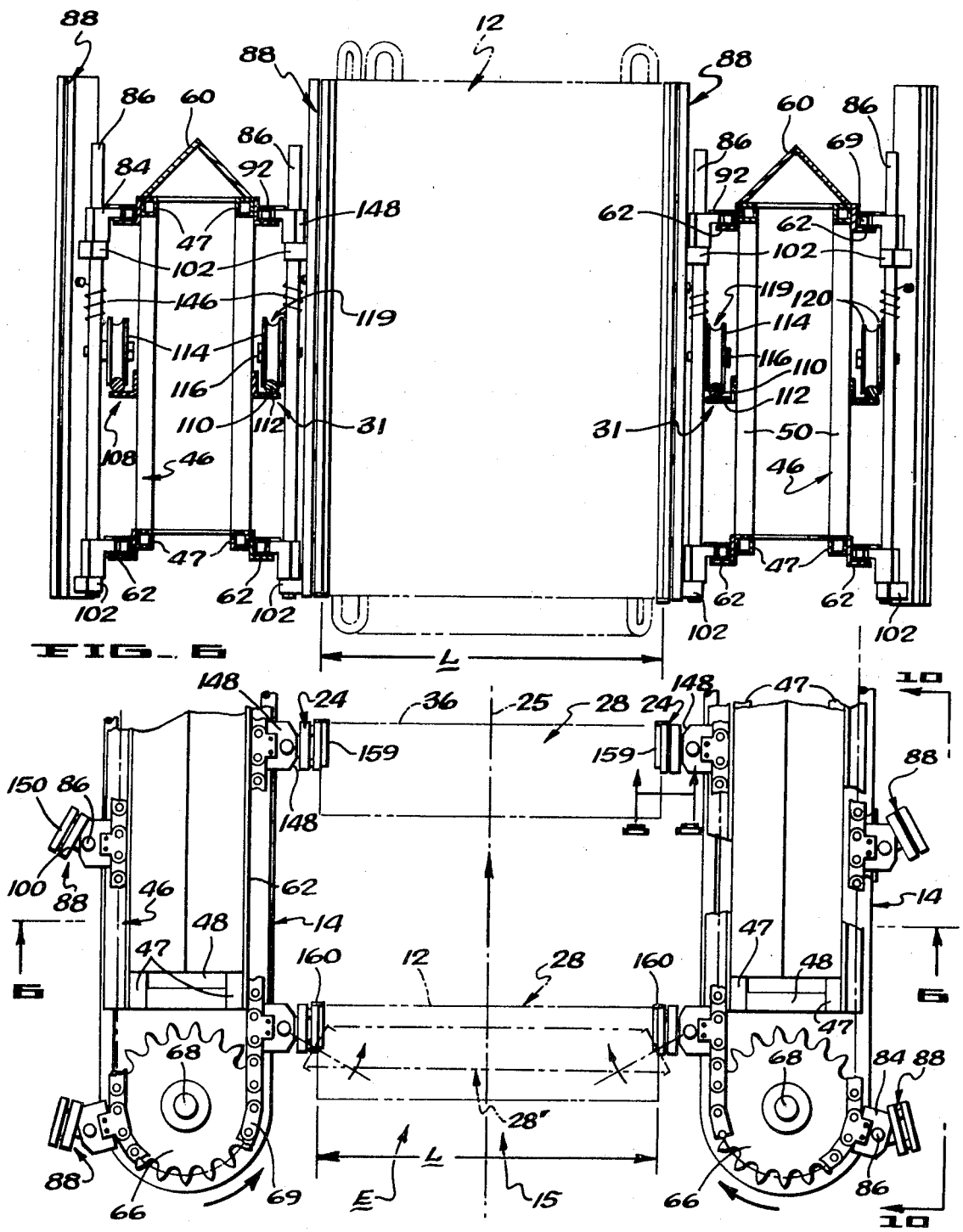

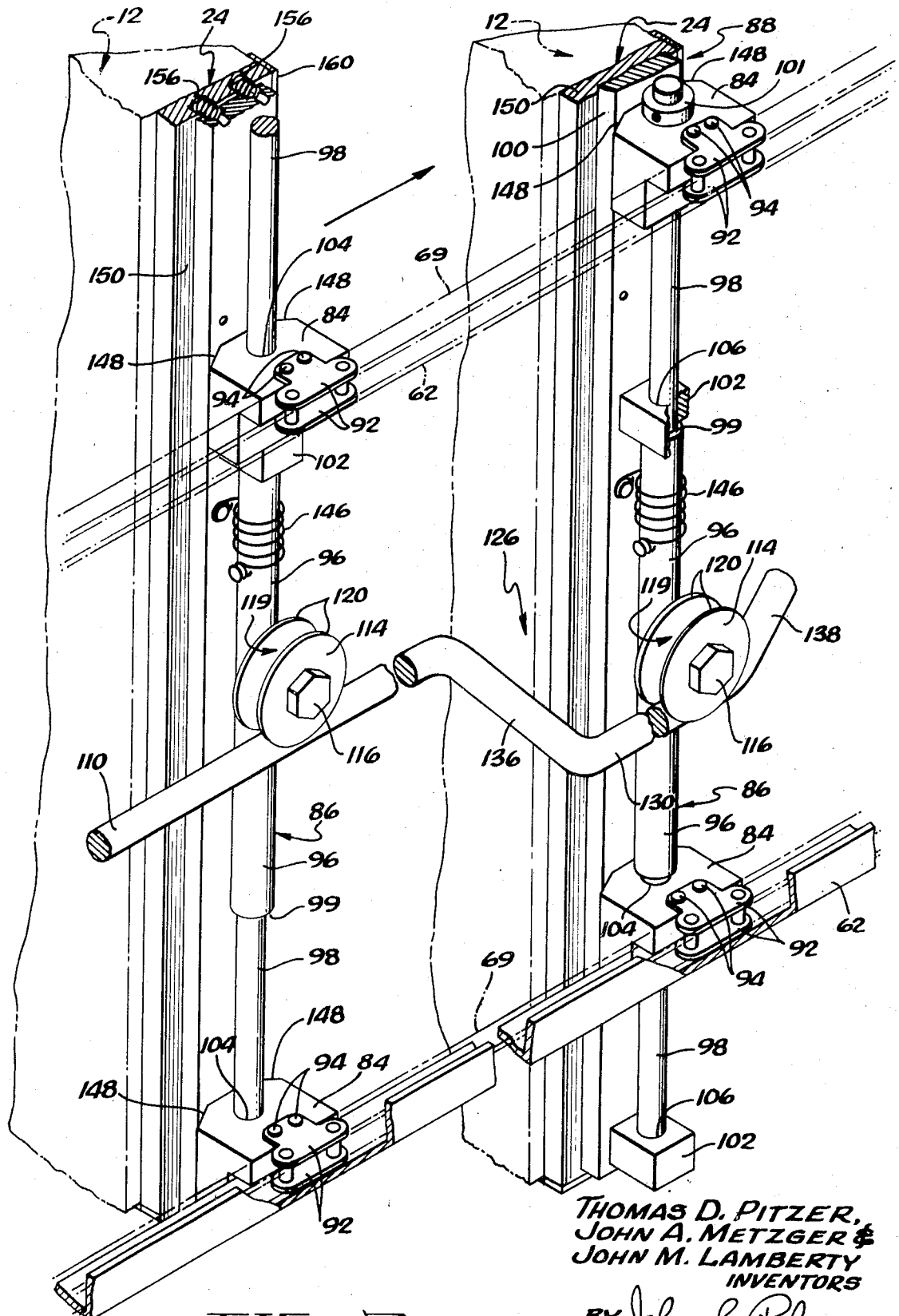

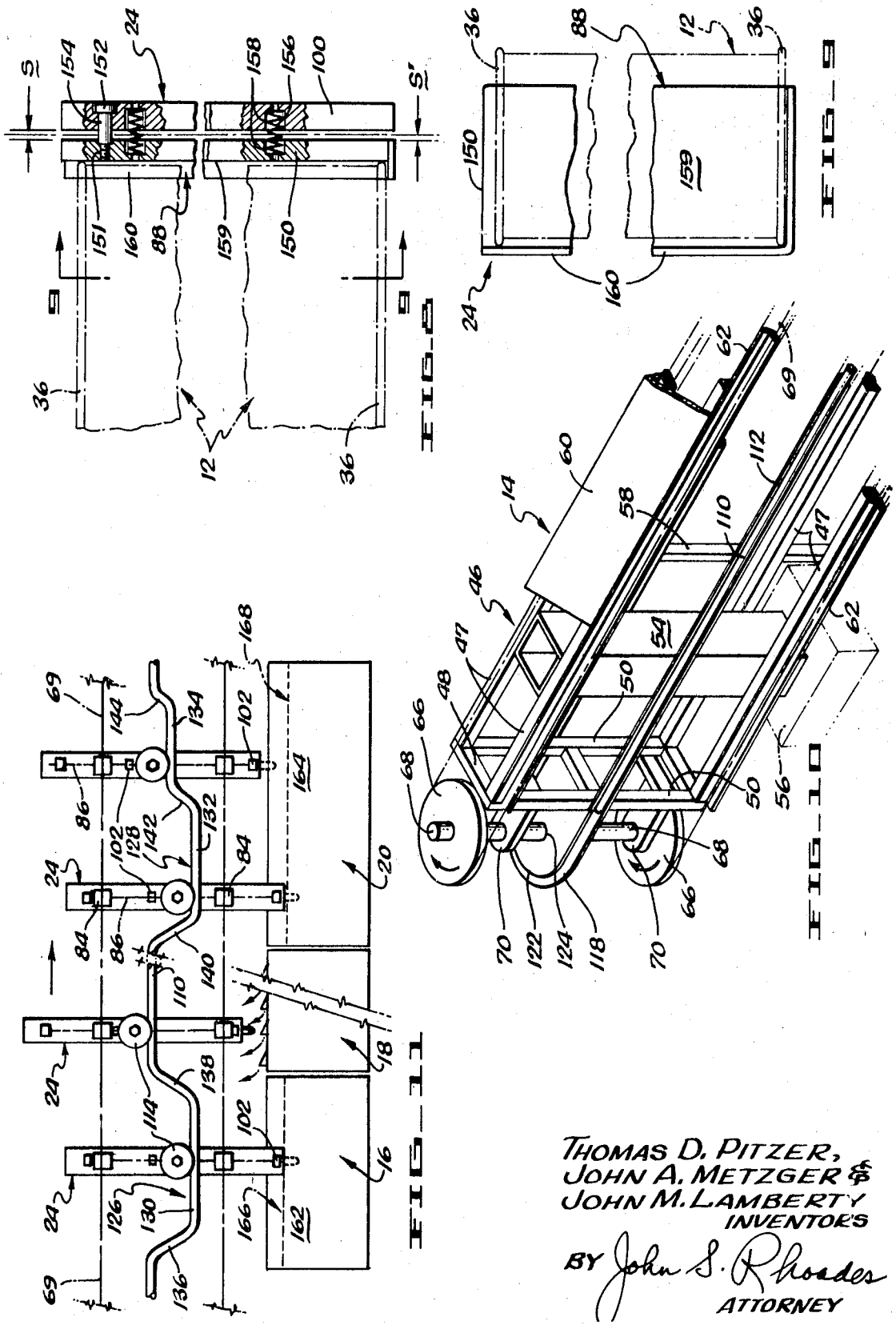

WORKPIECE HANDLING AND CONVEYOR APPARATUS

BACKGROUND OF THE INVENTION

This invention relates to a workpiece handling and conveyor apparatus. More particularly, it relates to a workpiece handling and conveyor apparatus for advancing a workpiece to and through successive workpiece treating stations. In one advantageous embodiment of the invention the apparatus can be used in the flux coating, preheating and dip-soldering of a heat exchanger.

Various apparatus have been designed in the past for use in dip-soldering workpieces, such as radiator cores, etc. Examples of such apparatus are shown in U.S. Pat. No. 2,765,761 to Truran granted on Oct. 9, 1956, and U.S. Pat. No. 3,000,342 to Dorosz granted on Sept. 19, 1961. Some of the principal deficiencies of prior art dip-soldering apparatus were that they did not permit the workpiece to be quickly and simply snap-locked into an articulated workpiece holder without interrupting the forward movement of the holder and thereby slowing down production. Prior art apparatus also were not so constructed that they could precisely maneuver the workpieces into and through the various workpiece treating stations.

The improved apparatus of the instant invention is provided with unique articulated workpiece holders and improved means for securing the holders to an endless conveyor device. The structure of the holders and their manner of attachment to the conveyor enables pretreated and posttreated workpieces to be snap-locked into position on and to be released from the workpiece holders rapidly and simply without materially interrupting or interfering with the normal continuous advancement of the various workpiece holders at selected line speeds.

SUMMARY OF THE INSTANT INVENTION

It is the primary purpose of the instant invention to provide an improved workpiece handling and conveyor apparatus comprised of endless chain-type conveyor elements having paths of travel that traverse one or more work performing stations, e.g., a flux station, a preheat station and a dip soldering station. Suitably affixed to the conveyor elements are articulated workholders or workpiece engaging clamps arranged in cooperating pairs. The various workpiece clamps are pivotally and slidably mounted in opposed relation to each other on opposed endless conveyor devices. These opposed and fully synchronized conveyor devices combine to form a unique moving production line for dip-soldering a radiator or heat exchanger core advanced along the line by way of the articulated clamps or holders pivotally suspended from the conveyor elements in a unique fashion. The pivotally mounted holders include improved biasing means for pivotally biasing each holder from a closed to an open position and vice versa whereby opposed holders or clamps can simultaneously quickly and efficiently engage and/or release various workpieces depending on whether the workpieces are to be or have been processed on the production line.

The production line can include novel cam and follower means for use in controllably and precisely immersing successive workpiece holders together with the workpieces in a dip solder bath and for then withdrawing the holders and workpieces from the bath at a relatively rapid rate and while handling relatively fragile workpieces in a firm yet gentle fashion.

The instant apparatus is particularly useful in dip-soldering the socket joints of aluminum radiator cores on a mass production basis.

BRIEF DESCRIPTION OF THE DRAWINGS

FIG. 1 is a diagrammatic perspective view of certain parts of a preferred embodiment of a dip-soldering multistation production line of the instant invention;

FIG. 2 is a broken perspective view of a typical tubelike heat exchanger which can be processed on the production line of the instant invention;

FIG. 3 is an enlarged side-elevational view taken along line 3—3 of FIG. 2 and illustrates a typical socket tube joint in the heat exchanger of FIG. 2;

FIG. 4 is a cross-sectional view taken along line 4—4 of FIG. 3 in which the right-hand portion of the Figure illustrates the socket joint between adjoining tube ends during selective immersion of the socket joint into a flux solution prior to soldering and the left-hand portion of the Figure illustrates the socket joint during precise immersion of the socket joint into a molten solder bath including the soldering thereof;

FIG. 5 is an enlarged fragmented top plan view generally taken along line 5—5 of FIG. 1 and illustrates, in dotted and solid lines, several operative positions of the articulated workpiece holder in preferred embodiments of the apparatus at the inlet end thereof;

FIG. 6 is a sectional view taken along line 6—6 of FIG. 5;

FIG. 7 is an enlarged partially perspective view with parts added and other parts broken away, taken in the area of line 7—7 of FIG. 5, and depicts several workpiece holders in different operative positions;

FIG. 8 is an enlarged fragmented side elevational view of a workholder taken along line 8—8 of FIG. 5 and with parts of a workpiece added;

FIG. 9 is a side elevational view taken along line 9—9 of FIG. 8;

FIG. 10 is a perspective view partially broken away and with parts removed, generally taken in the general area of line 10—10 of FIG. 5; and FIG. 11 is a partially broken side elevational and schematic view of the apparatus of FIG. 1 taken along line 11—11 and illustrates more than one operative position of a workpiece holder.

DETAILED DESCRIPTION

With further reference to the drawings, a preferred embodiment of the instant invention generally involves a multistation production line 10 for dip-soldering aluminum heat exchangers or radiator cores and the like in a relatively rapid continuous and progressive manner.

Line 10 generally comprises a pair of parallel and appropriately spaced endless conveyor assemblies 14 defining an elongated passageway or corridor 15. Located at various points along the passageway are several work stations, namely a flux station 16, a preheat station 18 and a dip-soldering station 20.

A plurality of articulated work holders or clamps 24 are pivotally and slidably affixed to the several conveyor assemblies 14 such that they are arranged on each side of the passageway in opposed pairs which move in unison with each other along the passage and along axis 25 of the apparatus, as best indicated in FIG. 5.

Each work holder 24 is biased from a closed pocket position 28 to an opened pocket position 28' for initially receiving a radiator core 12 at the entrance E of the passageway as best illustrated in FIG. 5. A radiator core is a relatively fragile workpiece that ordinarily cannot withstand severe abuse during manufacture. After a core 12 is inserted in the open pocket formed by a pair of work holders 24, the work holders 24 are closed about the workpiece in the manner of appropriately tensioned clamps or grippers as will become more fully described hereinafter.

As indicated in FIG. 1, an overall common drive 30 can be used to drive the various conveyor assemblies 14 so that the movements of opposed workpiece holders 24 can be fully synchronized. Conveyor assemblies 14 include cam and follower means 31 for progressively and selectively raising and lowering holders 24 and the workpieces gripped by holders 24 as holders 24 move through passageway 15. The fully controlled raising and lowering of holders 24 along with a core 12 gently handled by holders 24 into and out of flux station 16, etc., provides for precision dip-soldering of various socket joints J of the core whereby quality controlled cores can be advantageously mass produced as will become more apparent hereinafter.

As best indicated in FIGS. 2-4, the workpiece such as an aluminum heat exchanger or radiator core 12 having socket tube joints J at the top and bottom thereof to be dip soldered by the apparatus of the instant invention is generally comprised of a plurality of parallel-spaced tubes 32 mounted in a well known fashion in a series of spaced and apertured sheets or heat dissipating fins 34. Top and bottom sheets 34 are covered by top and bottom reinforcing plates 36 and each plate 36 is somewhat thicker and has a length L somewhat greater than the length of any of the intermediate fins 34. Since these plates are engaged directly by the work holders 24, they bear the brunt of workpiece holder contact and whatever abuse ensues and thereby indirectly protect the intermediate and thinner fins 34.

Each end 38 of a tube 32 is enlarged and flared outwardly somewhat to define a socket for receiving the end 42 of a U-shaped tube elbow 40 inserted therein in a well-known manner to form a joint J. The instant apparatus 10 operates to precisely immerse core tubes 32 and 40 in the area of joint J in a liquid flux solution at station 16. Then the flux coated end core 12 is subsequently immersed for the optimum time interval in a molten solder bath at station 20 to a depth that is less than the depth of immersion of the same core at the liquid flux coating station 16 in order to prevent a dip solder coating, as indicated by the exaggerated and generally curvilinear lines 44 in FIG. 4, from leaking or seeping past the open end 42 of a tube 40 as the result of capillary action of the molten solder during immersion of a flux coated core end in the molten solder bath at station 20.

If the molten dip solder coating should for some reason seep past the open end 42 of tube 40 during the solder immersion operation, it will at most form a simple fillet 45 of the type shown in FIG. 4. If, on the other hand, the molten solder is permitted to excessively or indiscriminately leak past the open end 42 of a tube 40 at a joint J, the leaked solder could upon final solidification cause a substantial blockage of the tube opening in the final radiator product thereby rendering it unfit for use. In short, the instant apparatus advantageously monitors the solder immersion of the product with substantial precision and good product quality control.

Conveyor assemblies 14 and individual holders 24 will now be described in detail. Each assembly 14 includes a rigid elongated box truss 46 made up of a plurality of interconnected bars 47, 48 and 50. Truss 46 can be mounted at each end thereof on upright posts or stanchions 54 supported on a suitable base 56. Truss 46 can be further rigidified by means of a triangularly shaped plate 60 connected to the upper bars 47 of the truss, if desired. In an advantageous embodiment of the invention L-shaped track or flange members 62 are connected to certain bar elements 47 to provide upper and lower pairs of tracks on opposite sides of a truss 46.

As indicated, particularly in FIGS. 1, 5 and 10, upper and lower sprockets 66 are mounted on a common shaft 68 supported by journal members 70 suitably affixed to the ends of box truss 46. Endless chains 69 are trained about the sprockets 66 and an appropriate chain tensioning device such as a resiliently biased idler sprocket (not show) can be used with a truss 46 for exerting proper tension on chains 69 during operation of production line 10.

Common drive 30 includes electric motor 72 which drives shaft 74 on which spaced gears 76 are mounted in the manner illustrated in FIG. 1. The usual gear reducer and transfer devices 78 are connected to the lower ends of shafts 68 at one end of the apparatus 10. Each transfer device 78 can include an input stub shaft 80 appropriately connected to shaft 68. A gear 82 mounted on shaft 80 meshes with a gear 76 on driven shaft 74. If desired, one of the transfer devices 78 can be provided with an idler or reversing gear (not shown). From the above description, it will be apparent that when motor 72 is energized, shafts 68 will be simultaneously driven in opposite directions and their speed fully synchronized as they drive upper and lower chains 69.

In a preferred embodiment of the instant invention and as indicated in FIG. 7, a given workholder 24 can comprise upper and lower L-shaped blocks or carriage elements 84, a shaft 86 and a workpiece gripper or holder subassembly 88. Certain links 90 of each double-link chain 69 are provided with special ears 92. These ears are used to connect the top and bottom sides of the flange of a block 84 of a given workholder 24 to a chain 69 when screw assemblies 94 lock the blocks to the chains 69. Workholder shaft 86 includes an enlarged intermediate portion 96 provided with shoulders 99 and outer reduced end portions 98. A work holder gripper subassembly 88 is comprised of an elongated outer baseplate 100 to which a pair of lugs 102 are secured.

Blocks 84 and lugs 102 for a given holder 24 are provided longitudinally alignable apertures 104 and 106 for slidably receiving the outer reduced end portions 98 of a shaft 86 in the manner illustrated in FIGS. 6–7 during connection of a pair of upper and lower blocks 84 of each holder 24 to the chain links 90 of upper and lower chains 69 of a given conveyor assembly 14. Although holder blocks 84 are connected to upper and lower conveyor chains 69, these blocks as well as the chains 69 are directly and slidably supported by upper and lower trackways 62 of the conveyor assembly in the manner depicted in FIGS. 6–7 and 10.

For a reason that will become more apparent hereinafter, the bottom side of the upper lug 102 of the baseplate 100 of holder 24 is arranged in opposed relation to the upper shoulder 99 of shaft 86 of the work holder. If desired, a collar stop 101 can also be adjustably attached to the upper reduced end portion 98 of the shaft, as indicated in FIG. 7.

An appropriate cam and follower assembly 31 is utilized to control the elevation and depression of work holder shaft and gripper subassemblies 86 and 88 relative to holder blocks 84 as these blocks move along trackways 62. This cam and follower assembly generally comprises opposed elongated cam rods 110 supported by elongated L-shaped bars 112 attached to each of the trusses 46 intermediate upper and lower trackways 62 and end post elements 50. The bars 112 on opposite sides of a given conveyor assembly 14 are preferably disposed in planar alignment relative to each other and extend in coextensive supporting relationship for the length of bars 110. Each rod 110 is suitably affixed to the horizontal track section of a contiguous bar 112.

The peripherally grooved wheel 114 of a cam and follower device 31 is journaled on an enlarged portion 96 of the shaft 86 of each holder 24 by means of a capscrew 116 and the cam rod 110 fits within the groove 119 of each wheel 114 mounted on the rod. Wheels 114 and rods 110 are the primary supports for the workpiece holders 24 as illustrated in FIGS. 1, 6–7 and 11.

As indicated particularly in FIG. 10, in order to effect the continuous and smooth transitions of a holder wheel 114 and its holder 24 from one side of a truss 46 to the opposite side thereof, an outwardly projecting U-shaped guide and support bracket 118 is connected to end bar elements 50 at either end of truss 46 so as to form continuations of rods 110. If desired, plate 122 having a smaller radius than bracket 118 can be disposed inside of bracket 118 for engaging the back flange of a wheel 114 and for holding such flange and wheel on bracket 118 as the wheel makes a turn at the end of a truss and reverses its direction.

As indicated in FIGS. 1, 7 and 11, preselected sections of cam rods 110 within passageway 15 are advantageously formed with generally U-shaped depressions 126 and 128 in the area of flux and dip-soldering stations 16 and 20 of the production line 10. Intermediate portions of bars 112 can be cut away in the areas of depressions 126 and 128 so that the U-shaped and depressed stepped portions 126 and 128 of the opposed rods 110 are located in the same planes as the noncutaway portions of the opposed rods. The bottom 130 of depression 126 and the stepped bottom 132 of depression 128 can all be directly supported by appropriate segments of bars 112, as aforedescribed. The gradual downwardly and inwardly inclined rod portions 136 and 138 of depression 126 and the gradual downwardly and inwardly inclined rod portions 140, 142 and 144 of depression 128 permit smooth and continuous up-and-down and horizontal movements of the workpiece holder 24 into and out of the flux- and dip-soldering station tanks, etc., as well as smooth transitions from horizontal to vertical paths of travel and vice versa.

The gripper assembly 88 of each holder 24 is pivotally biased relative to its shaft 86. As indicated in FIGS. 5-7, a helical coil spring 146 surrounds intermediate portion 96 and the opposite ends of this spring are connected respectively to the backside of baseplate 100 immediately below upper lug 102 and to the enlarged portion 96 of shaft 86 so as to bias gripper subassembly 100 about the shaft 86 normally in the direction of the trailing edge of holder 24 during advancement of the holder through corridor 15.

The forward and trailing edges of holder blocks 84 are advantageously provided with bevelled surface portions 148 to permit unrestricted pivoting of gripper assemblies 100 under the biasing action of springs 146. As opposed grippers 88 pivot to open or expand, they form a pocket 28' of approximately trapezoidal shape in horizontal transverse section that can accept or receive a radiator core 12 manually or machine fed between the opposed grippers 88 adjacent the entrance E of passageway 15 in the production line. The major dimension of pocket 28' is of a somewhat larger extent than the overall length L of a core 12 or the workpiece to be engaged by grippers 88. This facilitates the initial insertion of the core between opposed holders or grippers 88.

Inasmuch as the weight of a pair of holders 24 and the core gripped by the holders is carried primarily by holder wheels 114 mounted on rails 110, the tension of the various holder springs 146 will ordinarily have little or no effect in producing a disengagement of wheels 114 from their associated rails 110.

A gripper subassembly 88 advantageously includes an outer elongated narrow plate 150 resiliently and slidably connected to the inner baseplate 100 thereof as indicated in FIGS. 5-8 by means of capscrews 152. Each capscrew has an enlarged shank 154 somewhat loosely located in adjacent apertured portions of opposed and aligned stepped apertures 151 in plates 100 and 150. A series of small yet stiff coil springs 156 are individually inserted in adjacent pockets 158 between opposed inner faces of plates 150 and 100. Springs 156 advantageously serve to urge the interior plates 150 of a pair of such plates within corridor 15 into constant pressure contact with the article such as a core 12 gripped by the pair thereof and allow workpiece holders 88 to absorb shocks upon workholders 88 releasing their grip on the workpiece. This pressure contact will be maintained until the article 12 is gripped by hand or another mechanical device and pulled out of the grip of plates 150. An L-shaped ledge element 160 is attached to the bottom edge of a plate 150 and the leading side edge thereof when disposed within corridor 15. The ledge elements 160 of opposed plates 150 within passageway 15 help to guide the article to be grasped and seated in a precise position between the opposed plates 150 therewithin.

As indicated particularly in FIG. 11, liquid flux solution tank 162 is located at station 16 and a molten solder bath tank 164 is located at station 20. The materials 166 and 168 in each tank is constantly maintained at the desired level by way of appropriate replenishment devices (not shown). Thus, as indicated particularly in FIGS. 3 and 4 of the drawings, the level of materials 166 and 168 in tanks 162 and 164 is maintained so that each joint J in the lower end of a given core 12, when the core is dipped into the various tanks by holders 24, will be immersed to selected depths in the various tanks. Thus, the open end 42 of a core tube 40 at a given joint J will be disposed slightly above the top surface of the flux material when it is immersed in tank 162 and somewhat higher above the surface of the dip solder material in tank 164 so as to completely avoid any capillary action problems, all in the manner illustrated by the respective level lines X and Y in FIG. 4.

It is to be understood that the molten solder bath will be held at a predetermined elevated temperature level to effect proper dip-soldering of the joints J at the lower end of a core inserted between a pair of holders 24 of the apparatus. Receptacle 164 may include a suitable mechanism (not shown) for removing dross from the surface of the solder bath 168 as the result of dip-soldering lower joints J of successive cores 12 in continuous fashion during operation of the apparatus.

Preheat device 18 of suitable construction can be used to effect evaporation of the volatile agent in the flux coating on joints J at the end of core 12 dipped in the coater and for elevating the temperature of flux-coated joints J prior to dipping the joints into the solder bath at station 20.

During use of the apparatus of the instant invention an operator can manually insert a core 12 between a pair of opposed holders 24 at the entrance of passageway 15 as these holders 24 advance from left to right in FIG. 1, or such insertion can be done by a machine. Prior to the insertion of the core, conveyor assemblies 14 will, of course, have been adjusted relative to each other until the present distance between a pair of opposed surfaces 159 of the pair of holders is somewhat less than the length L of plates 36 of a radiator core 12, when the pair of holders 24 are pivoted to a closed pocket position 28. The distance between the pair of opposed holders 24 prior to initially receiving a core within passageway 15 should be such that plate 150 of either one of the pair of holders 24 will not be fully compressed against backer plate 100 upon insertion of a workpiece between surfaces 159 of the holders as indicated in FIG. 8 whereby the intermediate springs 156 can perform a biasing and shock absorbing function.

When a core 12 is inserted between a pair of opposed holders 24 at the entrance of passageway 15, the operator will usually align the upper and lower plates 36 of the core relative to opposed surfaces 159 of the pair of holders 24 biased to an opened and expanded pocket position 28' as illustrated in FIG. 5. At the same time the operator advances the aligned core at a rate greater than the rate of longitudinal advancement of the pair of holders 24 through passageway 15 whereby the opposite ends of upper and lower plates 36 initially engage upper and lower portions of opposed surfaces 159 of the pair of holders 24. Continued advancement of the core between the pair of holders 24 will cause the opposed grippers 88 of the pair of holders 24 to pivot against the action of springs 146 until the opposed grippers are pivoted from open pocket position 28' to closed pocket position 28.

If the core is inserted between holders 24 at the entrance of passageway 15 prior to holders 24 being in supporting engagement with the opposed trackways, the unsupported chain portions of chains 69 interposed between sprockets 66 and trackways 62 at the entrance of passageway 15 will permit holders 24 to have limited lateral expansion relative to each other so as to facilitate insertion of a core 12 or other workpiece between the pair of holders 24. When the opposed grippers are pivoted from an open pocket position to a closed pocket position by the insertion of a core between the opposed grippers, the inserted core acts as an interconnecting rigid link between the opposed pair of holders 24 and advantageously serves to create a snap-lock clamping action between the pair of holders 24. Inasmuch as plates 36 extend for a greater distance L than the distance between surfaces 159 of shoes or plates 150 of a pair of holders 24 when they are in a closed pocket position 28, springs 156 of grippers 88 of a pair of holders 24 and springs 146 of the same holders are put under compression and resiliently hold the workpiece in position between the grippers.

As the result of the aforesaid snap-lock action, the core can be positioned by the operator between the opposed grippers 88 without accidentally disconnecting the core from between the pair of holders 24 as shown in FIGS. 5-9 and 11. The upper and lower opposed trackways 62 within passageway 15 maintain the preset distance between the pair of holders 24 required to resiliently hold the core in a clamped condition at all times.

As illustrated in FIGS. 1, 7 and 11 opposed grippers 88 of the pair of holders 24 together with shafts 86 of the pair thereof are progressively lowered and raised relative to the upper and lower blocks 84 of the pair thereof in a direction generally transverse of the longitudinal advancement of the pair of holder through passageway 15 as wheels 114 of holders 24 move across rod portions 136, 130 and 138 of opposed U-shaped depressions 126 during operation of the apparatus of the instant invention past station 16 thereof. Upon proper insertion of a core 12 between opposed grippers 88 of a pair of holders, the grippers retain a sufficient grip on a core whereby it will not relax their grip even when the core comes into contact with and is dragged through the materials in tanks 162 and 174 at stations 16 and 20.

After passage of a pair of cooperating holders 24 through station 16, the pair of holders 24 with the core held therebetween is elevated to its initial elevated position, as at the entrance of passageway 15, in order to pass through preheat station 18 in the manner illustrated in FIG. 11. Rods 140, 132, 142, 134, and 144 of opposed U-shaped depressions 128 at station 20 after preheat station 18 advantageously serve to gradually lower and raise the pair of holders 24 together with the core therebetween relative to the station 20 during continuous and progressive advancement of the pair of holders and core through station 20 for dip-soldering the preheated and flux-coated lower end of the core. After the end of the tube 40 at a given socket joint J is immersed the precise amount below the surface level of the solder bath at station 20, the intermediate step of opposed U-shaped depressions 128 as defined by rods 134 advantageously serves to raise the holders 24 to an intermediate elevation in order that excess solder can be manually or mechanically wiped off from the bottom of the tubes 40 at the lower end of the core in a conventional and well-known manner as illustrated in FIG. 11. Since the lower end of a core is disposed below the pair of holders 24, the holders themselves are not immersed in the baths at stations 16 and 20, thereby enabling continued reuse of the pair of holders without frequent servicing and cleaning of the same.

When a cooperating pair of holders 24 with the dip-soldered core disposed therebetween reach the right end of apparatus 10 as viewed in FIG. 1, an operator or a machine can grasp the dip-soldered core at a point located between the pair of holders and move the core at a greater rate than the rate of longitudinal advancement of the holders through passageway 15 whereupon the pair of opposed holders 24 will automatically pivot outwardly in the manner of swinging doors towards their forward beveled portions 148 and in a general direction towards the exit or right end of passageway 15 as viewed in FIG. 1, thereby allowing release of the core held therebetween. The pair of opposed holders 24, after release of the core, advance in reopened pocket positions about the opposed and outer reaches of their associated upper and lower conveyors 64 of supports 14 prior to reentering passageway 15 at entrance E at the left end of apparatus 10 and accepting another core to be dip-soldered in the manner aforedescribed, as shown in FIGS. 1 and 5.

In one preferred embodiment of the invention the instant apparatus can be used to dip-solder radiator cores made from relatively thin tubes of aluminum alloy and which have overall dimensions on the order of 4 inches in width, 15 inches in length and 20 inches in height. The apparatus can operate at a production rate on the order of 150 cores per hour. The flux composition at station 16 can consist of a suitable grade of zinc chloride and other inorganic salts suspended in an alcohol solution, such as methanol, at room temperature. The molten solder at station 20 can be made up primarily of metallic zinc maintained at a temperature of about 750° to 850° F. The lower and flux-coated end of a core can be preheated as noted above during passage between stations to a temperature on the order of 400° to 550° F. in order to sufficiently preheat the lower end of the core and flux coating thereon thereby evaporating the alcohol of the flux coating prior to dip-soldering of the core.

The apparatus of the instant invention can be used for handling other workpieces and for carrying out other work operations from that specifically described above such as dip-coating a hollow container with a protective film such as lacquer and the like. Moreover, although the cam and follower device 31 is shown as being interposed between upper and lower chains 69, it could be arranged above or below these chains 69. It is to be understood that only one work holder of a pair of work holders 24 may have a coil spring 146 for pivotally biasing the gripper 88 thereof to an open pocket position relative to the other work holder of the pair thereof. Depending on the workpiece, a ledge may only be required for one of the gripper plates 150 of a pair of workholders 24 in the manner aforedescribed. Further, a given pair of opposed holders 24 within passageway 15 could be progressively raised and lowered in a direction other than vertical relative to the longitudinal advancement of the pair of holders through passageway 15 during operation of the apparatus. Finally, passageway 15 could have other shapes than the specific linear shape shown.

Although not shown, a suitable automatically operated device can be used in combination with the apparatus of the instant invention for automatically loading and/or unloading a core at the entrance and/or exit of the apparatus. Such a device, for example, could include a pair of mechanical arms for selectively releasing or gripping the top and bottom of a core being fed or released from a pair of holders 24 at the entrance or exit of the apparatus. The aforesaid device would, of course, be operated such that it would not interfere with the otherwise normal continuous operation of the apparatus of the instant invention as aforedescribed.

Advantageous embodiments of the invention have been shown and described. It is obvious that various changes and modifications may be made therein without departing from the appended claims, wherein:

What is claimed is:

1. A workpiece handling and transporting apparatus for transporting workpieces from one station to another and for maneuvering workpieces through individual stations, said apparatus comprising opposed conveyor devices arranged in spaced and parallel relationship, articulated work holders affixed to and arranged in opposed and cooperating paired relationship on said conveyor devices for alternately engaging workpieces therebetween and then releasing the workpieces therefrom during operation of said conveyor devices, each of said work holders including a pivotally and resiliently mounted gripper and a roller means, means for activating said conveyor devices and at least a pair of opposed work holders in unison, and track means engageable with the roller means on the pair of work holders for selectively and in unison lowering and raising the pair of work holders and the workpiece engaged by the pair of work holder grippers as the pair of work holders move from station to station and through a given station.

2. An apparatus as set forth in claim 1 including a common drive means for said conveyor devices.

3. An apparatus as set forth in claim 1 in which at least one of the grippers on a work holder in the pair of work holders includes a resiliently biased shoe means for directly engaging a workpiece upon insertion of the workpiece in the pocket formed between said pair of work holders during the selective advancement of said pair of work holders by the conveyor devices.

4. An apparatus as set forth in claim 1 in which one of the work holders of said pair of work holders includes a ledge means for engaging a side portion of a workpiece when the workpiece is inserted in the pocket formed by said pair of work holders during selective advancement of said pair of work holders.

5. A workpiece handling and transporting apparatus comprising opposed conveyor devices arranged in spaced parallel relation and defining a multistation production line passageway therebetween, articulated work holders affixed to and arranged in opposed and cooperating paired relationship on said conveyor devices for alternately engaging workpieces therebetween and then releasing workpieces therefrom during operation of said conveyor devices, means on each of said work holders including a carriage and a gripper pivotally mounted on said carriage for engaging a workpiece, common drive means connected to said conveyor devices for advancing pairs of opposed work holders and the workpieces engaged therebetween in unison through the passageway and cam means connected to each work holder and engageable with a track means disposed in said passageway for selectively and in unison raising and lowering given pairs of work holders and the workpieces gripped by said pairs of work holders relative to workpiece treating equipment in a given station in said passageway.

6. A workpiece handling and transporting apparatus as set forth in claim 5 in which said common drive means is comprised of a motor connected to each of said conveyor devices.

7. A workpiece handling and transporting apparatus as set forth in claim 5 including spring means connected to a gripper and normally urging the gripper to an expanded open pocket position relative to the opposed and cooperating gripper of another work holder.

8. A workpiece handling and transporting apparatus as set forth in claim 5 in which the gripper of one work holder of said pair of work holders includes inner and outer plates and spring means interconnecting the pair of plates so as to urge the inner plate of said pair of plates into resilient clamping engagement with a workpiece upon insertion of the workpiece in the pocket formed between said pair of work holders.

9. A workpiece handling and transporting apparatus as set forth in claim 5 in which the gripper of one of the work holders of said pair of work holders includes a ledge means for engaging an opposed side of a workpiece when the workpiece is inserted in the pocket formed between said pair of work holders.

10. A workpiece handling and transporting apparatus comprising opposed conveyor devices arranged in spaced parallel relation and defining a multistation production line passageway therebetween, articulated work holders affixed to and arranged in opposed and cooperating paired relationship on said conveyor devices, each work holder in a pair of cooperating work holders being provided with means for selectively engaging and releasing a workpiece during movement of said work holders along said passageway, said means including a carriage and a gripper pivotally mounted on a carriage, a spring means for normally biasing said gripper to a selected expanded and open position on said carriage and a further spring means for biasing a portion of said gripper directly against a workpiece engaged by the gripper as the workpiece tends to force a retraction of said portion of the gripper upon contacting said gripper portion.

11. A workpiece handling and transporting apparatus as set forth in claim 10 wherein said opposed conveyor devices are operated by a common drive means.

12. A workpiece handling and transporting apparatus as set forth in claim 10 including cam and follower means for selectively and in unison raising and lowering a given pair of cooperating work holders along with the workpiece engaged by the said pair of work holders at various stations of the production line.

13. A workpiece handling and transporting apparatus as set forth in claim 10 in which at least one of said grippers for a work holder includes a pair of plates one of which is adapted to directly contact workpieces and resilient means for interconnecting said pair of plates.

14. A workpiece handling and transporting apparatus as set forth in claim 10 including a ledge means disposed on the gripper of at least one of the work holders for engaging an opposed side of a workpiece.

15. A workpiece handling and transporting apparatus as set forth in claim 10 in which one workpiece treating station of the production line is a workpiece flux-coating station.

16. A workpiece handling and transporting apparatus as set forth in claim 10 in which one workpiece treating station of the production line is a workpiece preheat station.

17. A workpiece handling and transporting apparatus as set forth in claim 10 in which one workpiece treating station of the production line is a workpiece dip-soldering station.

* * * * *